US012155077B2

(12) United States Patent
Kumar et al.

(10) Patent No.: US 12,155,077 B2
(45) Date of Patent: Nov. 26, 2024

(54) INTERCONNECTING STRUCTURE FOR ENERGY STORAGE CELLS IN AN ENERGY STORAGE DEVICE

(71) Applicant: TVS MOTOR COMPANY LIMITED, Chennai (IN)

(72) Inventors: Prabhanjan Kumar, Chennai (IN); Senthilnathan Subbiah, Chennai (IN); Samraj Jabez Dhinagar, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 738 days.

(21) Appl. No.: 17/292,239

(22) PCT Filed: Nov. 7, 2019

(86) PCT No.: PCT/IN2019/050826
§ 371 (c)(1),
(2) Date: May 7, 2021

(87) PCT Pub. No.: WO2020/095325
PCT Pub. Date: May 14, 2020

(65) Prior Publication Data
US 2021/0408645 A1    Dec. 30, 2021

(30) Foreign Application Priority Data

Nov. 8, 2018 (IN) .............................. 201841042121

(51) Int. Cl.
*H01M 50/204* (2021.01)
*H01M 10/42* (2006.01)
(Continued)

(52) U.S. Cl.
CPC ....... *H01M 50/204* (2021.01); *H01M 10/425* (2013.01); *H01M 50/213* (2021.01);
(Continued)

(58) Field of Classification Search
CPC . H01M 50/204; H01M 50/503; H01M 50/509
See application file for complete search history.

(56) References Cited

U.S. PATENT DOCUMENTS 6,972,544 B2 * 12/2005 Seman, Jr. ............ H01M 50/51
320/112
2005/0079408 A1 * 4/2005 Hirano ................ H01M 10/613
429/174
(Continued)

FOREIGN PATENT DOCUMENTS

JP        3848565 B2    11/2006
JP        2007-508681 A  4/2007

OTHER PUBLICATIONS

Notice of Reasons for Refusal (JP Search, no date) (Year: 0000).*
(Continued)

*Primary Examiner* — Amanda C. Walke
(74) *Attorney, Agent, or Firm* — Osha Bergman Watanabe & Burton LLP (57) ABSTRACT

An energy storage device includes one or more energy storage cells being disposed in the at least one cell holder and one or more interconnecting structures adapted for electrically connecting the one or more energy storage cells. Each of the one or more interconnecting structures includes one or more openings adapted for securely positioning each of the one or more energy storage cells in the at least one cell holder.

9 Claims, 5 Drawing Sheets (51) Int. Cl.
    *H01M 50/213*    (2021.01)
    *H01M 50/249*    (2021.01)
    *H01M 50/503*    (2021.01)
    *H01M 50/509*    (2021.01)
    *H01M 50/516*    (2021.01)
    *H02J 7/00*          (2006.01)

(52) U.S. Cl.
    CPC ....... *H01M 50/249* (2021.01); *H01M 50/503* (2021.01); *H01M 50/509* (2021.01); *H01M 50/516* (2021.01); *H01M 2010/4271* (2013.01); *H01M 2220/20* (2013.01); *H02J 7/0047* (2013.01)

(56) References Cited

U.S. PATENT DOCUMENTS

2022/0216553 A1* 7/2022 Palatov ................ G01R 31/382
2022/0216711 A1* 7/2022 Palatov ............... H01M 50/213

OTHER PUBLICATIONS

Machine translation of JP 2011-154883 (no date) (Year: 0000).*
International Search Report issued in corresponding International Application No. PCT/IN2019/050826 mailed Feb. 21, 2020 (3 pages).
Written Opinion of the International Searching Authority issued in corresponding International Application No. PCT/IN2019/050826 mailed Feb. 21, 2020 (5 pages).

* cited by examiner

INTERCONNECTING STRUCTURE FOR ENERGY STORAGE CELLS IN AN ENERGY STORAGE DEVICE

TECHNICAL FIELD

The present invention relates to a vehicle. More particularly, the present invention relates to at least one interconnecting structure for energy storage cells in at least one energy storage device.

BACKGROUND

In recent times there is an increased demand to control emissions from automobiles, in view of stringent emission norms. As a result, a number of hybrid and electric vehicles are seeing the light of the day in order to minimize the amount of emissions. Typically, hybrid vehicles have distinct advantage of allowing long travel, as at least one source is always available to drive the vehicle. Hence, there is low risk of running out of fuel or getting stranded as it frequently happens with a traditional internal combustion powered vehicle.

Generally, existing hybrid vehicles configured to be powered either by an internal combustion engine or electric motor or both, are replacing normal engine powered vehicles. For example, driving on terrain or for long distances, an internal combustion engine can be used and for shorter distances electric propulsion system can be used. However, incorporation of both internal combustion engine and electric motor assembly in the hybrid two-wheeled vehicle makes the system bulky and more complex.

Thus, electric vehicles have gained popularity in recent years as the potential replacement for internal combustion vehicles, since they promise zero emission from electric drive system, and a break away from oil dependency. Hence, a focus of the electric vehicle industry in battery research is directed to rechargeable batteries, such as sealed, starved electrolyte, lead/acid batteries, are commonly used as power sources in vehicles and the like. However, lead-acid batteries are heavy, bulky, and have short cycle life, short calendar life, and low turn around efficiency and hence, a pure electric vehicle entails a problem in that its own weight increases and a traveling distance is short, and due to packaging constraints it is difficult to mount one or more batteries as an additional rechargeable back-up power source in the limited spaces of the vehicle which may involve further structural challenges for installing said one or more additional batteries thereon.

In order to overcome problems associated with said conventional energy storage devices including the lead-acid batteries for the vehicle, a lithium ion battery cells provides an ideal system for high energy-density applications, improved rate capability, and safety. Further, the rechargeable energy storage devices—lithium-ion batteries exhibit one or more demanding characteristics which makes it useable on the vehicle. First, for safety reasons, the lithium ion battery is constructed of all solid components while still being flexible and compact. Secondly, the energy storage device including the lithium ion battery exhibits similar conductivity characteristics to primary batteries with liquid electrolytes, i.e., deliver high power and energy density with low rates of self-discharge. Thirdly, the energy storage device as the lithium ion battery is readily manufacturable in a manner that it is both reliable and cost-efficient. Finally, the energy storage device including the lithium ion battery is able to maintain a necessary minimum level of conductivity at sub-ambient temperatures.

In a known structure for an energy storage device, said one or more energy storage cells including lithium ion battery cells are disposed in at least one holder structure in series and parallel combinations. Generally, said one or more interconnecting structures are adapted for electrically interconnecting at least one array of said one or more energy storage cells being disposed in said at least one energy storage device. Particularly, each of the one or more interconnecting structures and at least one of said one or more energy storage cells are made of dissimilar materials, i.e, said one or more interconnecting plates includes metal plate made up of steel and said one or more energy storage cells terminals of nickel being not as good of a conductor as the steel, hence said one or more interconnecting plates including metal plates having high thermal and electrical conductivity are electrically connected to at least one terminal of each of said one or more energy storage cells through a spot welding method to form at least one contact point.

BRIEF DESCRIPTION OF THE DRAWINGS

The detailed description is described with reference to the accompanying figures. The same numbers are used throughout the drawings to reference like features and components.

DETAILED DESCRIPTION

In a typical design for one or more interconnecting structures, one or more slits are integrally formed in at least a portion thereof. The one or more slits comprises at least one electrode structure configured of forming at least one contact joint with at least one terminal of each of said one or more energy storage cells through the spot welding. Particularly, each of said one or more slits formed in said at least a portion of said one or more interconnecting structures includes a shaped profile having a small cross section, thus, the shunt current passing through said each of said one or more interconnecting structures takes extremely short travel path and a shorter time interval to travel through each of said one or more interconnecting structures due to which a larger current flow through said each of one or interconnecting plates develops very less resistance across said at least one electrode structure of said one or more interconnecting plates and said at least one terminal of the one or more energy storage cells which is either not sufficient enough to heat said at least one electrode structure to molten steel or forms a weak contact point between said interconnecting structures and said one or more energy storage cells.

In another known design for said one or more slits in said at least a portion of each of the one or more interconnecting structure, high shunt current flow through said each of the one or more interconnecting structures due to less resistance developed across said at least one electrode structure and said at least one terminal of said each of the one or more energy storage cells which results in difficulty in getting molten steel to that spot for electrically connecting said each of the one or more interconnecting statures to said each of the one or more energy storage cells.

In yet another known design for said one or more interconnecting structures including said one or more slits with the shaped profile having a lesser cross-section area, the high shunt current across said at least one contact point formed by spot welding said at least one electrode structure with said at least one terminal tends to reduce the diameter thereof, thereby rendering said one or more contact points more susceptible to damage, expulsions and degradation of said at least one electrode structure, hence causing damage to entire one or more energy storage cells and thus resulting in high cost replacement for the entire at least one cell of said one or more energy storage cells. Thus there is a need for a solution of improved interconnecting structure which can overcome all of the above problems.

With the above objectives in view, the present invention provides an improved design for the one or more interconnecting structures configured for electrically interconnecting one or more energy storage cells being disposed in the one or more configuration in at least one energy storage device. In one embodiment, each of said one or more interconnecting structures comprises one or more apertures in the form of the slits integrally formed in at least a portion thereof. In one embodiment, said one or more apertures including slits are formed in the manner so as to be in alignment with at least one terminal of said one or more energy storage cells being disposed in said at least one cell holder structure of said at least one energy storage device. As per one embodiment, said one or more apertures including slits are formed of at least one predetermined shape having a shaped profile of at least one predetermined cross-section area sufficient enough to facilitate a larger travel path for the shunt current passing through said one or more interconnecting structures, thereby developing high resistance across said at least one electrode structure formed integrally with said each of the one or more slits and said at least one terminal of each of the one or more energy storage cells, due to which larger heat generated thereto forms molten steel for electrically connecting said one or more interconnecting structures with said one or more energy storage cells and hence forms one or more contact points of higher stiffness and strength. More particularly, in one embodiment of the present invention, the one or more apertures including the slits are provided with said at least one predetermined shape configured to divert the path of the large shunt current flow through each of the one or more interconnecting structures, thereby facilitating ease in welding process and additionally minimizing the damage to the one or more contact point between said each of said one or more interconnecting structure and said terminals of each of the one or more energy storage cells. As per an embodiment, the slit opening is configured to be disposed substantially equally in terms of cross section area across the area of contacting terminal of storage cell thereby enabling a larger current flow path.

The present invention relates to an improved design for the one or more interconnecting structures configured for electrically connecting one or more energy storage cells being disposed in one or more configuration in at least one energy storage device. In one embodiment, said one or more apertures includes an inverted C-shaped slit. As per one embodiment, said at least one terminal of said each of the one or more energy storage cells is spot welded inside the C-shaped slits to form one or more contact points. Furthermore, as per one embodiment, said improved shaped profile of said one or more slits provides said one or more contact points formed of the predetermined diameter which facilitates a strong contact point to be formed between said each of the one or more interconnecting structures and said at least terminal of said one or more energy storage cells.

In one embodiment of the present invention, said at least one energy storage devices includes at least holder structure comprising one or more receiving portions integrally formed therein and adapted to receive said one or more energy storage cells. As per one embodiment, terminals of each of said one or more energy storage cells are electrically interconnected through the one or more interconnecting structures including a metal plate. More particularly, as per one embodiment, said one or more interconnecting structures includes a rigid metal plate made up of steel material connected to terminals of said one or more energy storage cells. As per one embodiment, said one or more interconnecting plates transmits large currents between said cells. In one embodiment, said one or more apertures in the form of said slits internally formed with said at least one or more interconnecting structures includes the predetermined shaped profile with the predetermined cross-section area sufficient to divert the shunt current across a predetermined path of the predetermined shaped profile of each of the one or more apertures. Thus, higher resistance developed across said at least one electrode structure of the one or more slits and said at least one terminal of said energy storage cells facilitates in getting a molten steel for forming at least one contact point therebetween. As per another embodiment, the weld points on either side of the slit of the interconnector may be disposed asymmetrically in a vertical manner or lateral manner or a combination thereof.

The object of the present invention is to provide an improved design for said one or more interconnecting structures adapted for interconnecting arrays of said one or more energy storage cells. More particularly, as per one embodiment, said one or more interconnecting structures are patterned with said one or more apertures formed in at least a portion therein. In one embodiment, each aperture of said one or more apertures forms electrical connections between said at least one electrode structure and said at least one terminal of said one or more energy storage cells.

In one embodiment, said at least one energy storage device includes said one or more energy storage cells disposed in said at least one holder structure of said energy storage device. As per one embodiment, said one or more energy storage cells disposed in said one or more configuration including parallel and series configuration are electrically connecting through one or more interconnenecting structures includes one or more slits of said at least one predetermined shape and adapted for diverting the shunt current one or more energy storage cells, thereby minimizing the risk of weld damage and electrode expulsion between said each of the one or more interconnecting structures and each of the one or more energy storage cells.

Further, one embodiment of the present invention describes an improved design of said one or more interconnecting structures adapted for electrically connecting said one or more energy storage cells being disposed in at least one configuration in at least one energy storage device. In one embodiment, said improved design for said one or more interconnecting structures includes one or more slits of said at least one predetermined shape which is configured to divert large amount of shunt current being generated in said at least one energy storage devices, thereby withstanding the spot welding without damaging said one or more energy storage cells.

Various other features and advantages of the invention are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. With reference to the accompanying drawings, wherein the same reference numerals will be used to identify the same or similar elements throughout the several views. It should be noted that the drawings should be viewed in the direction of orientation of the reference numerals.

Figure 1:
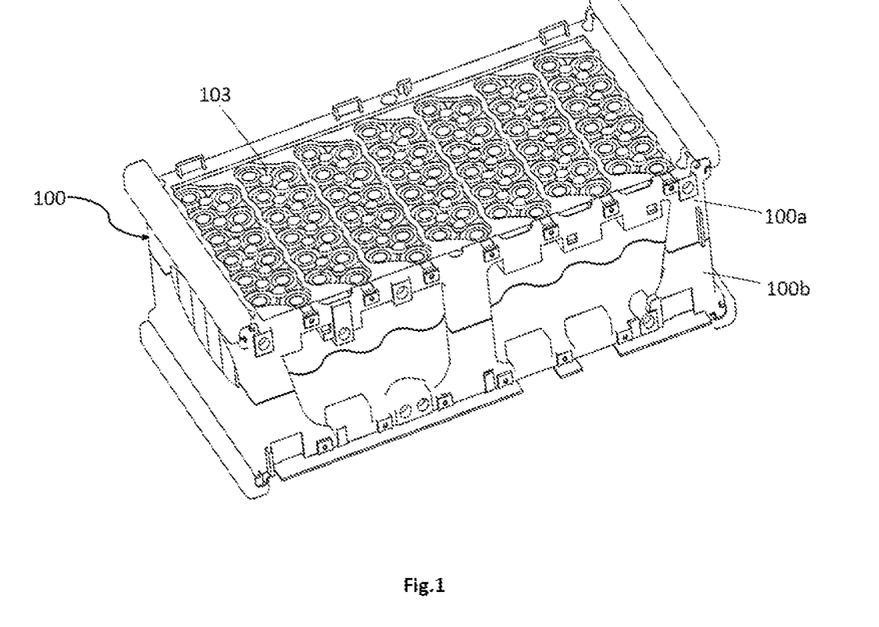
FIG. 1 is a perspective view of at least one energy storage device, as per one embodiment of the present invention.

FIG. 1 is a perspective view of at least one energy storage device (100), as per one embodiment of the present invention. In one embodiment, said battery pack (100) comprises at least one cell holder (100a), (100b) including a securing cell holder (100a) and a receiving cell holder (100b). In one embodiment, said at least one energy storage device (100) further comprises one or more energy storage cells (not shown) being disposed in said at least one cell holder (100a), (100b). As per one embodiment, said one or more energy storage cells are electrically connected in at least one configuration including a series combination and parallel configuration to form said one or more array of combinations for said one or more energy storage cells. As per one embodiment, each of said one or more array of said one or more energy storage cells are electrically connected to said battery management system (101) (shown in FIG. 2) at one or more corresponding connection points (102) (shown in FIG. 2) provided on said battery management system (101) through at least one mounting provision. As per one embodiment, said each of said array of one or more array of combinations including one or more are electrically connected one or more storage cells (106) are connected together through one or more interconnecting structures (103).

Figure 2:
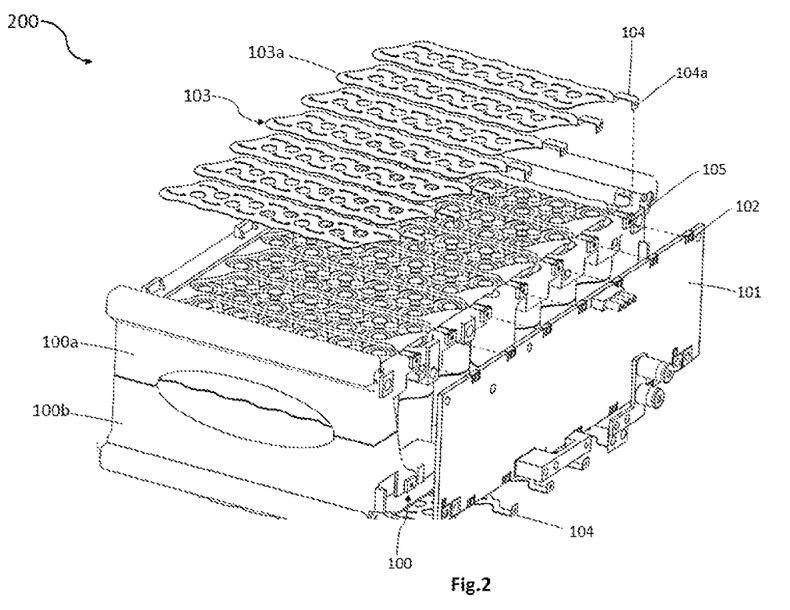
FIG. 2 is an exploded view of said at least one energy storage device, as per one embodiment of the present invention.

FIG. 2 is an exploded view of said at least one energy storage device (100), as per one embodiment of the present invention. In one embodiment, said at least one energy storage device (100) comprises said battery management system (201) electrically connected thereto. In one embodiment said each of the array of said one or more energy storage cells are disposed in at least one holder structure (100a), (100b). In one embodiment, said one or more interconnecting structures (103) are adapted for electrically interconnecting said one or more energy storage cells. In one embodiment, at least one end portion (104) (shown in FIG. 4) of said each of said interconnecting structures (103) are electrically connected to said battery management system (201) for transmitting current and voltage output of said at least one energy storage device (100) thereto. Particularly, as per one embodiment, said at least holder structure (100a), (100b) includes one or more mounting provisions formed therein. The one or more interconnecting plates (103) through said one or more mounting provisions (105) is electrically connected to said battery management system (102) at one or more corresponding connection points (202). In one embodiment, said battery management system (101?) is configured for monitoring the output current and voltage for said at least one energy storage device (100) for transmitting said output current and said output voltage to one or more electrical components.

Figure 3A:
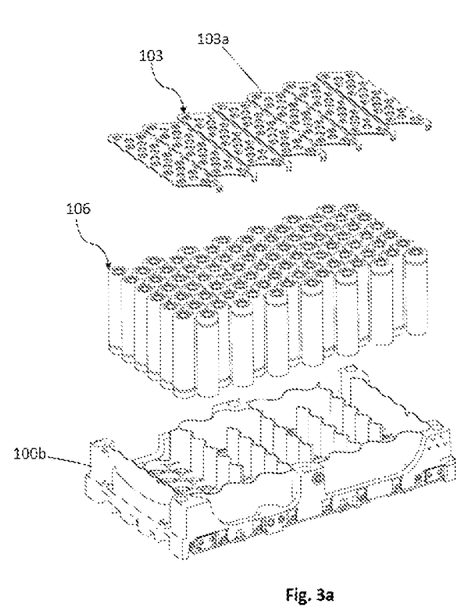
FIG. 3 is a perspective view of at least one interconnecting structure for said at least one energy storage device of FIG. 1, as per one embodiment of the present invention.
Figure 3B:
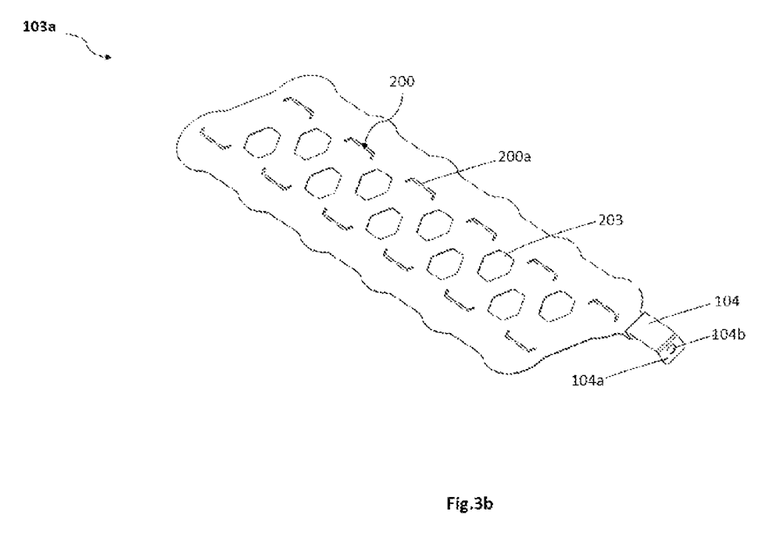

FIG. 3a & FIG. 3b is a perspective view of said at least one interconnecting structure (103a) of said one or more interconnecting structures (103) of said at least one energy storage device (100) of FIG. 1, as per one embodiment of the present invention. In one embodiment, said one or more energy storage cells (106) disposed in said at least one holder structure (100a), (100b) of said at least one energy storage device (100) are interconnected by the one or more interconnecting structures (103). In one embodiment, said at least one interconnecting structure (103) of said one or more interconnecting structures (103) (shown in FIG. 2) comprises said one or more openings (203) adapted for securely positioning said each of said one or more energy storage cells in said at least one holder structure (100a), (100b). In one embodiment, said at least a portion of said at least one holder structure (100a), (100b) includes one or more locking structure formed integrally with at least a portion thereof. The one-or more locking structure conforms to a predetermined profile of each of said one or more openings (203) to securely position said each of said one or more interconnecting plates to said at least one holder structure to lock interconnector while welding. As per one embodiment, said one or more apertures (200a) in the form of slits are formed in at least a portion of said each of said one or more interconnecting structures. In one embodiment, said at least one electrode structure (107) protruding towards a bottom face of said each of the one or more interconnecting structures is perpendicular to a surface thereof. As per one embodiment, at least one aperture (200a) of said one or more apertures (200) includes at least one predetermined shape of at least one predetermined cross-section which diverts the large amount of shunt current generated across said each of said one or more interconnecting path through a longer path (202) thereby minimizing the risk of weld damage and electrode expulsion between said each of the one or more interconnecting structures and each of the one or more energy storage cells.

Figure 4:
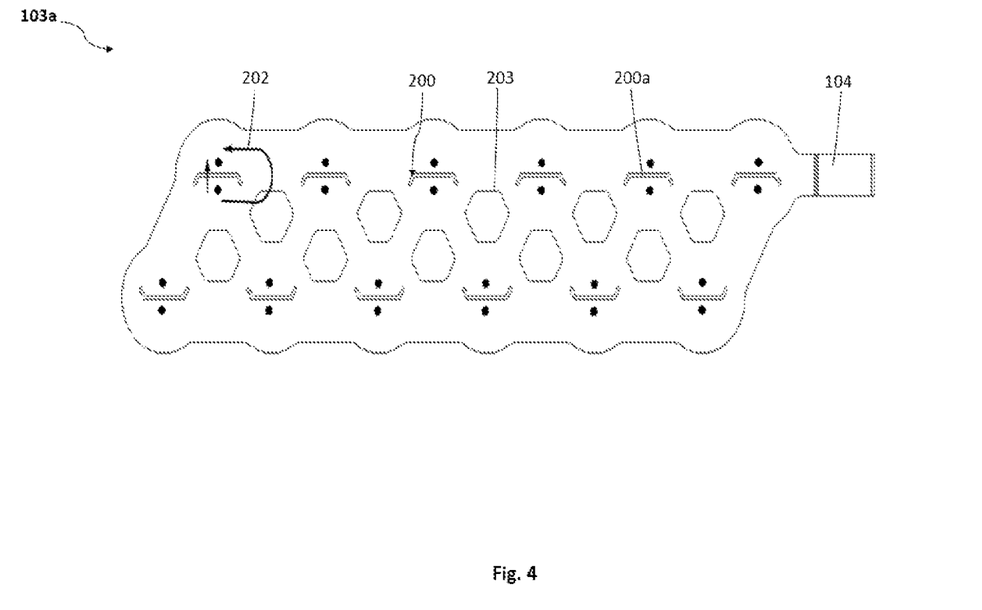
FIG. 4 is a side view of said at least one interconnecting structure including one or more apertures formed in at least a portion therein, as per one embodiment of the present invention.

FIG. 4 is a side view of said at least one interconnecting structure (103a) including said one or more apertures (200) formed in at least a portion therein, as per one embodiment of the present invention. As per one embodiment said at least one predetermined shaped profile of said one or more apertures (200) is a substantially C-shaped profile. In one embodiment, said at least one end portion (104) (shown in FIG. 4) of said each of said interconnecting structures (103) are electrically connected to said battery management system (BMS) (101) for transmitting current and voltage output of said at least one energy storage device (100) thereto through one or more mounting members including at least one attaching member including a fastener. As per one embodiment, said at least one end portion (104) including at least one mounting structure (104a) including at least one attachment receiving portion (104a) for electrically connecting said at least one interconnecting structures of said one or more interconnecting structures (103) to said battery management system (201).

Figure 5:
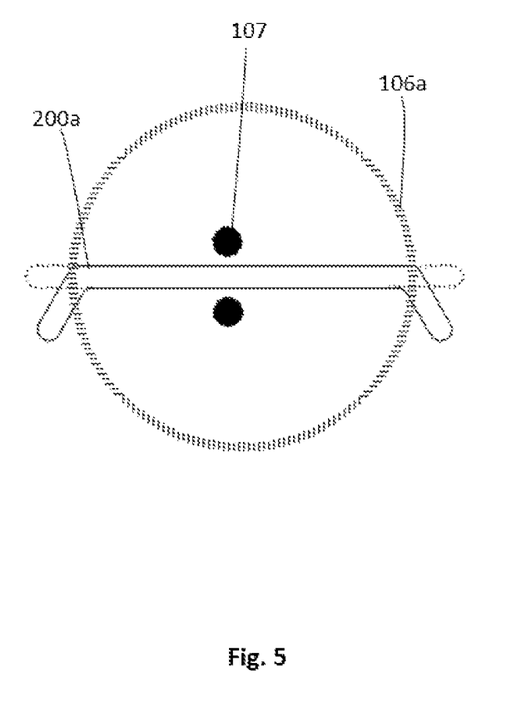
FIG. 5 illustrates at least one aperture of said one or more apertures formed in at least a portion of each of said one or more interconnecting slits of FIG. 3, as per one embodiment of the present invention.

FIG. 5 illustrates at least one aperture of said one or more apertures (200) formed in said at least a portion of each of said one or more interconnecting plates (103) of FIG. 3a & FIG. 3b, as per one embodiment of the present invention. As per one embodiment, said one or more contact points (106a) includes at least one spot weld position formed in alignment by electrically connecting said each of at least one electrode structure of said one or more apertures (200a) and said at least one terminal of said one or more energy storage cells (106) by said spot welding. In one embodiment, said at least one spot weld position includes at least one electrode structure (107).

Improvements and modifications may be incorporated herein without deviating from the scope of the invention.

We claim:

1. An energy storage device comprising:
   one or more energy storage cells being disposed in at least one cell holder; and
   one or more interconnecting structures adapted for electrically connecting the one or more energy storage cells, wherein
   each of the one or more interconnecting structures includes one or more openings adapted for securely positioning each of the one or more energy storage cells in the at least one cell holder, and
   each of the one or more interconnecting structures has one or more slits, each having a predetermined shape with a predetermined cross-sectional area that diverts shunt current generated across each of the one or more slits, wherein the diverted shunt current travels around each of the one or more slits.

2. The energy storage device as claimed in claim 1, wherein the one or more energy storage cells are electrically connected in at least one configuration including a series combination and parallel combination to form one or more array of combinations.

3. The energy storage device as claimed in claim 1, wherein the one or more energy storage cells are electrically connected to a battery management system at one or more corresponding connection points provided on at least a portion therein through at least one mounting provision.

4. The energy storage device as claimed in claim 1, wherein the each of one or more interconnecting structures include at least one electrode structure protruding towards a bottom face thereof.

5. The energy storage device as claimed in claim 4, wherein the at least one electrode structure is perpendicular to a surface of the each of the one or more interconnecting structures.

6. The energy storage device as claimed in claim 1, wherein the one or more slits have a substantially C-shaped profile.

7. The energy storage device as claimed in claim 1, wherein each of the one or more interconnecting structures has one or more contact points, wherein the one or more contact points include at least one spot weld position being formed in alignment by electrically connecting the each of at least one electrode structure of the one or more slits and at least one terminal of the one or more energy storage cells by spot welding.

8. The energy storage device as claimed in claim 7, wherein the at least one spot weld position weld points is integrally formed on either side of each of the one or more slits, and the at least one spot weld position is asymmetrically on either side of each of the one or more slits in a vertical manner, a lateral manner, or a combination thereof.

9. The energy storage device as claimed in claim 1, wherein each of the one or more slits is configured to be disposed substantially equal in terms of cross section area across an area of contacting terminal of one or more energy storage cells, thereby enabling a larger current flow path.

* * * * *